Figure 12:
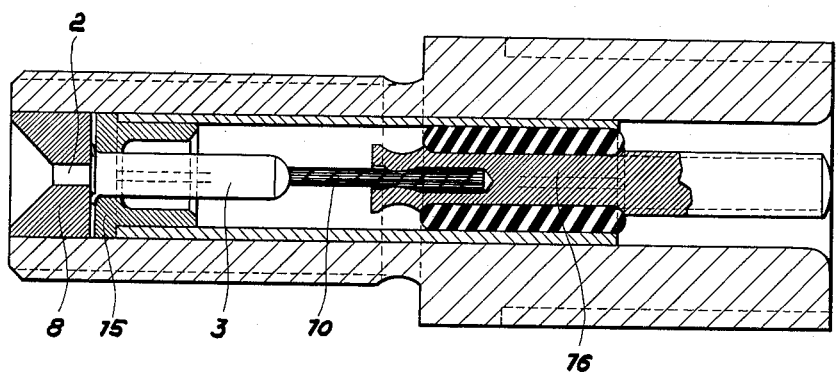

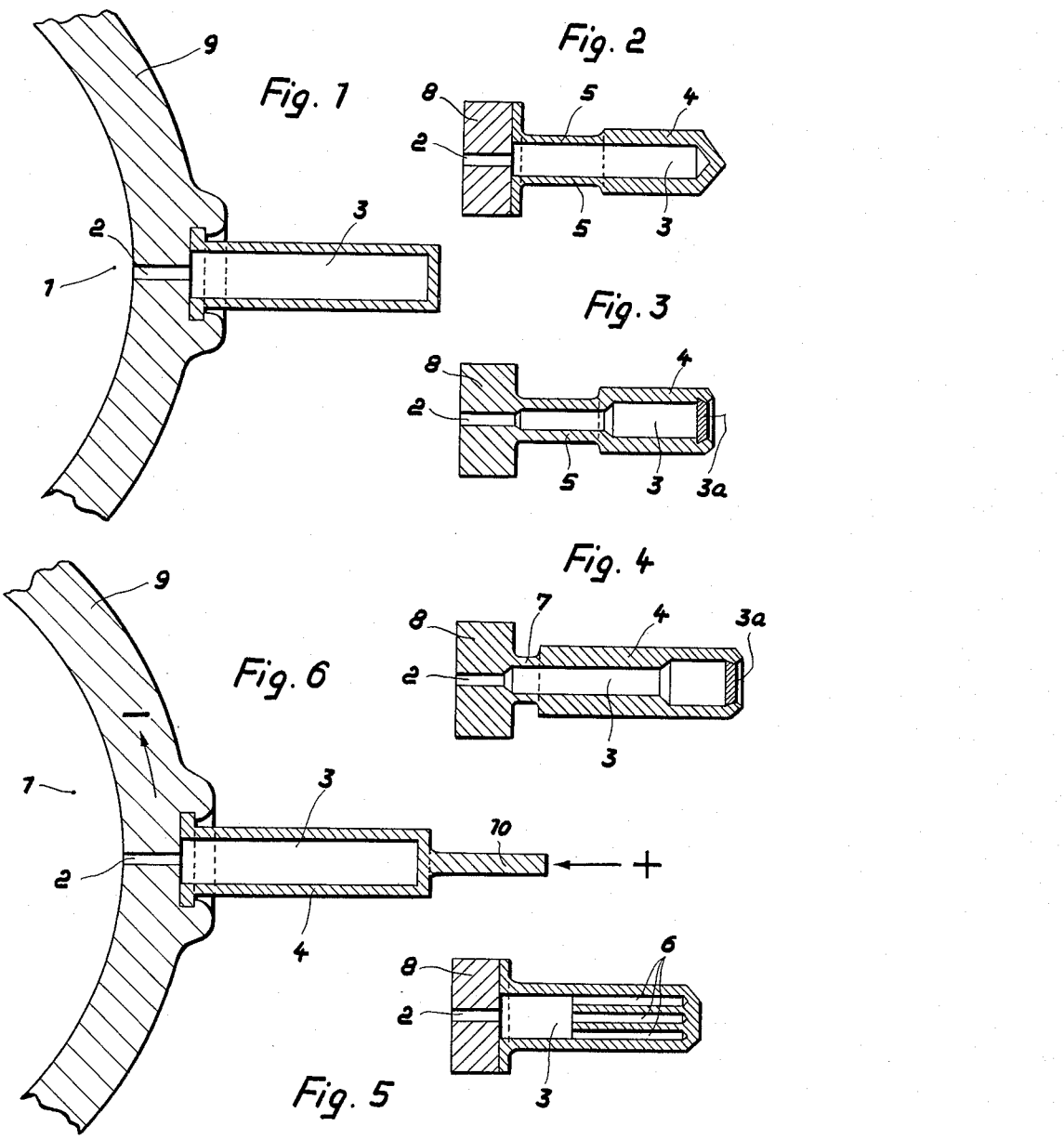

Aug. 15, 1961 H. VIERLING 2,996,056
APPARATUS FOR IGNITING FUEL MIXTURES
Filed May 1, 1959 5 Sheets-Sheet 3
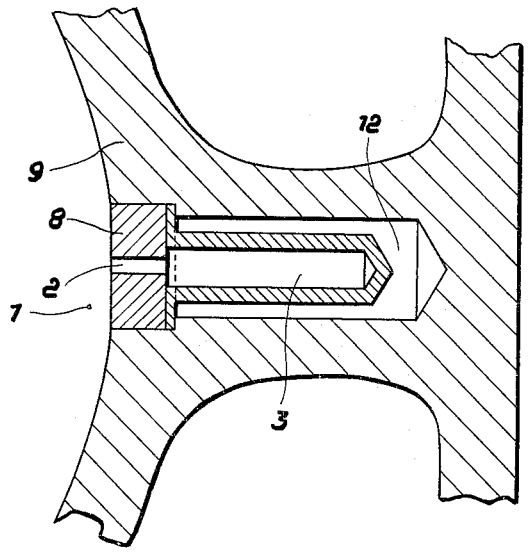
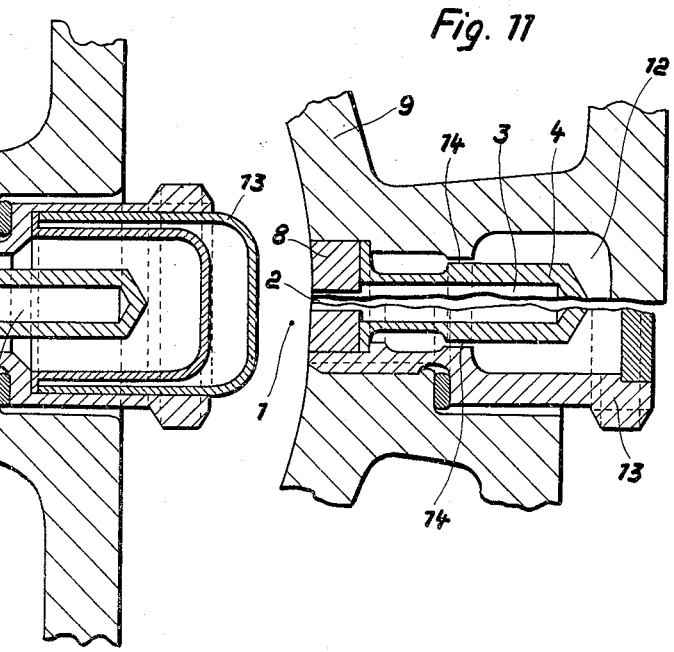
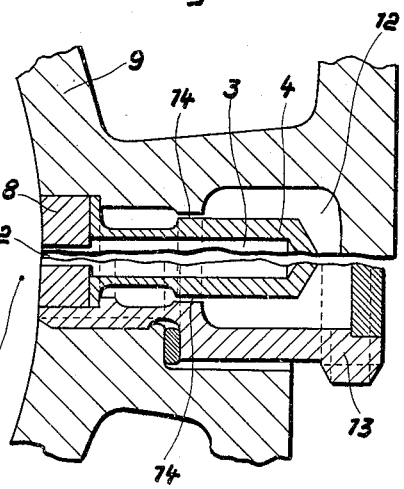
Inventor:
Hans Vierling
By Ernest Montague
Attorney Aug. 15, 1961   H. VIERLING   2,996,056
APPARATUS FOR IGNITING FUEL MIXTURES
Filed May 1, 1959   5 Sheets-Sheet 5

United States Patent Office 2,996,056
Patented Aug. 15, 1961

2,996,056
APPARATUS FOR IGNITING FUEL MIXTURES
Hans Vierling, Munich, Germany
(Prinz-Otto Str. 11, Ottobrunn, near Munich, Germany)
Filed May 1, 1959, Ser. No. 810,492
8 Claims. (Cl. 123—145)

The present invention relates to an apparatus for igniting fuel mixtures which are periodically compressed in a fuel chamber.

It is known that fuel material ignites itself with extremely low self-ignition temperature upon high compression in the burning chamber, and that such self-ignition is applied for operation of internal combustion engines. The ignition of fuel mixtures by means of low tension make and break ignition, or by means of high tension ignition, the so-called spark plug ignition is known. A further known ignition means is the use of a glow tube, in which a portion of the wall is brought into the glowing state by outside heating and the fuel mixture is ignited on said wall portion. This ignition method was still further changed by providing hot center projections in the glow tube.

The known ignition devices have the following drawbacks. For the self-ignition fuel material having a low self-ignition temperature only can be used by application of a high compression. The ignition takes place practically simultaneously in the entire burning chamber and an inefficient motor operation is brought about. The ignition timing cannot be controlled due to the required development of the effective pressure and the ignition timing moves off from a favorable to a non-desirable late or early point. The broadly used electrical ignition requires a great number of auxiliary parts. These auxiliary parts must comply wih many different conditions and require continuous service. The ignition plugs, or spark plugs, cannot be disposed at will in the burning chamber, since they must be accessible from the outside. By application of the glow tube ignition or similar ignition devices, the ignition takes place on a highly tempered metal part. This ignition requires, however, too much time and was not easily controllable, so that no satisfactory results were obtained.

It is one object of the present invention to provide an apparatus for igniting of fuel mixtures, which apparatus permits of an advantageous operation compared with previously known ignition devices.

It is another object of the present invention to provide an apparatus for igniting fuel mixtures which are periodically compressed in a burning chamber, whereby the burning chamber is connected with another chamber over a nozzle, the diameter of said other chamber being greater than that of the nozzle. Advantageously, said other chamber is of longitudinal configuration in general, so that its length is greater than its diameter. In accordance with the present invention, the diameter of the nozzle is preferably about ⅓ to ⅔ of the diameter of said other chamber.

It is another object of the present invention to provide an apparatus for igniting of fuel mixtures of the type set forth above, wherein the wall of said other chamber adjacent the nozzle has a smaller thickness than the thickness of the rear portion of the chamber. Preferably, the chamber wall may have a neck portion adjacent the nozzle.

It is yet another object of the present invention to provide an apparatus for igniting fuel mixtures, of the type set forth above, wherein said other chamber is formed as a smooth tube closed up at its rear end. It is also of advantage to subdivide the chamber at its rear portion into a plurality of individual chambers.

It is yet a still further object of the present invention to provide an apparatus for igniting fuel mixtures of the type set forth above, wherein the ignition apparatus, which comprises a chamber and a nozzle, may be inserted from the outside into the wall of the burning chamber, or from the inside into a corresponding bore, whereby the chamber does not engage the wall of the burning chamber. If the chamber is inserted from the outside, it may be covered advantageously by one or a plurality of protecting caps.

It is still a further object of the present invention to provide an apparatus for igniting fuel mixtures, wherein the chamber may be one part of a current conducting current system. It is of advantage that the current feeders, or the chamber, or both, are expandable by heat in the longitudinal direction, for instance by folding, by waving or by spiraling. Preferably, the wall of the chamber may be folded like bellows at one or a plurality of positions.

It is yet a still further object of the present invention to provide an apparatus for igniting fuel mixtures wherein between the wall portions surrounding the wall of said other chamber and the burning chamber, narrow annular slots are formed. In order to increase the ignition readiness, one or more diaphragms may be disposed inside of said chamber, which diaphragms are positioned at about the center of the effective chamber volume. The diaphragm or the diaphragms may be disposed advantageously between the chamber and the individual chambers adjacent the latter. The individual chambers which are disposed behind the diaphragm, may be arranged advantageously around the chamber and may be in intercommunication over a collecting chamber. In accordance with the present invention, one or a plurality of individual chambers may be arranged in heat contact at least with one additional chamber connected with the burning chamber.

It is also yet another object of the present invention to provide an apparatus for igniting fuel mixtures, wherein a chamber connected with a current feeding system is combined with a currentless working chamber system.

Figure 7:
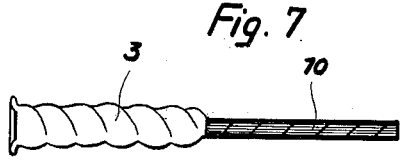
Figure 8:
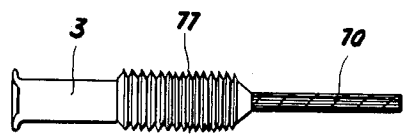
Figure 13:
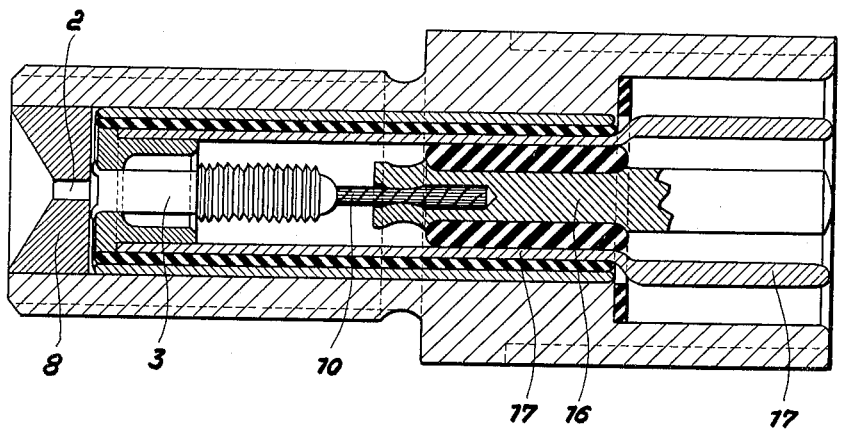
Figure 14:
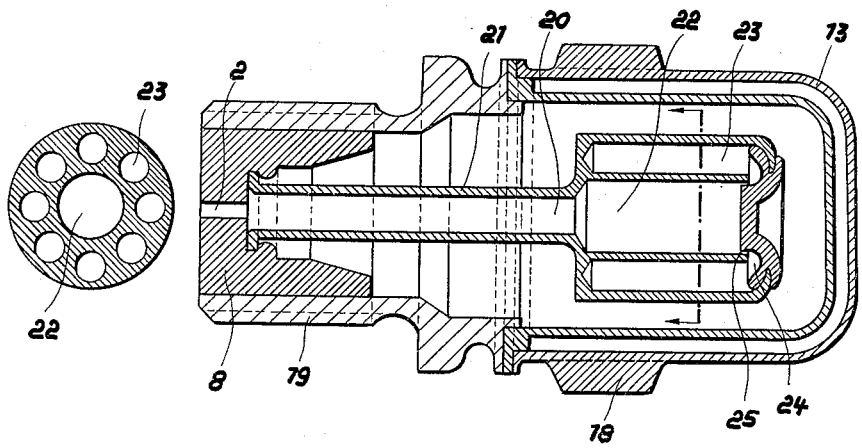
Figure 15:
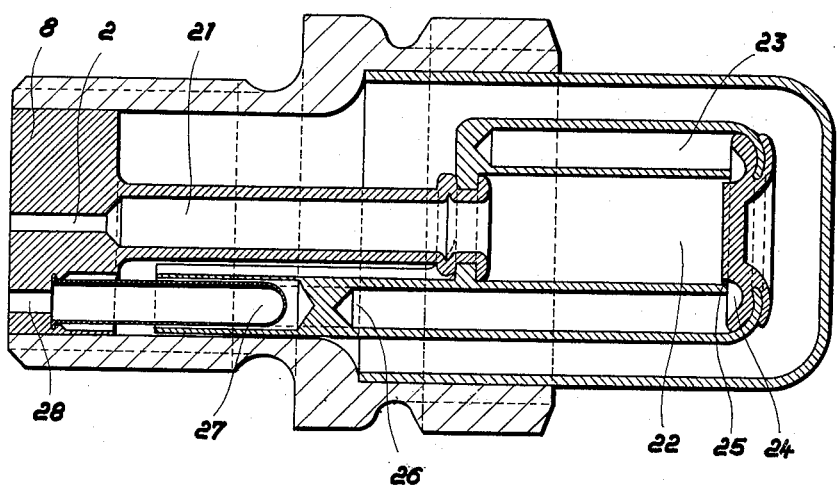
Figure 16:
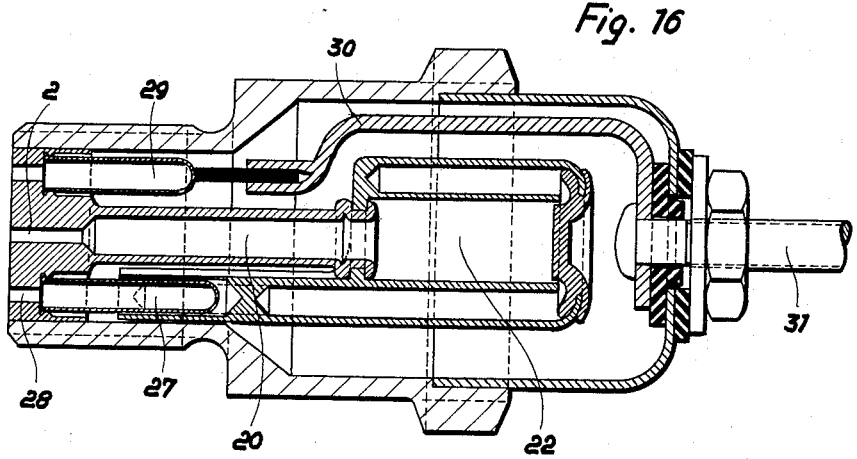

With these and other objects in view, which will become apparent in the following detailed description, the present invention will be clearly understood in connection with the accompanying drawings, in which:

FIGURE 1 is an axial section through a simple embodiment of the present invention;
FIGS. 2, 3 and 4 are sections of the chamber showing three different embodiments thereof;
FIG. 5 is a section of the chamber showing a particular embodiment thereof;
FIG. 6 is a section of the chamber disclosed in FIG. 1 joined with an electrical current feeder;
FIGS. 7 and 8 are elevations of chamber embodiments having electrical current feeding;
FIG. 9 is a section through a chamber disposed in a sack bore of the burning chamber;
FIG. 10 is a section of a chamber arrangement inserted in the burning chamber from the outside;
FIG. 11 is a section of the chamber walls showing annular slots, the upper portion showing the chamber inserted in a bore, and the lower portion showing the insertion of the chambers from the outside;
FIGS. 12 and 13 disclose sections through the chamber having particular electrical feeding systems;
FIG. 14 is another embodiment of the chamber;
FIG. 15 is yet a further embodiment of the present invention with an ignition chamber heated by a heating chamber; and
FIG. 16 is an embodiment of the present invention with a starting ignition chamber, an ignition chamber and a heating chamber.

Referring now to the drawings, and in particular to FIG. 1, the burning chamber 1 has inserted in its wall an ignition chamber 3.

If it is assumed that in the burning chamber, which may be one cylinder of an internal combustion engine, a periodical burning takes place, after one working phase a small amount of ignitable gas is accumulated in the chamber 3. During the compression stroke in the cylinder or burning chamber 1, a fresh mixture enters the chamber 3 through the nozzle 2 and is there ignited. The distance from the entrance of the nozzle to the effective ignition point in the chamber 3, measured at the median stream line of the entering fresh gas stream, is a so-called minimum burning distance maintained of such an order that the ignition flame does not back-fire even if the gas feeding speed is very low, as in an engine, for instance at a low number of revolutions. The ignition front, thus does not run against the direction of movement of the entering gases to the entrance of the nozzle and from there into the burning chamber 1 before an inner pressure has been formed in the chamber 3 by the ignition process, which inner pressure overcomes the compression pressure in the burning chamber 1, whereby the feeding of a fresh fuel mixture is brought to a standstill. If the original pressure difference from the burning chamber 1 to the chamber 3 is reversed, the burning gas enters through the nozzle 2 into the burning chamber 1 and ignites there the burnable mixture.

The nozzle 2 has the effect that during the compression of the fuel mixture in the burning chamber 1, the pressure in the chamber 3 follows somewhat damped the pressure in the burning chamber 1. If now an ignition takes place in the chamber 3 at a predetermined piston position, the inner ignition pressure is built up on the chamber pressure running behind the pressure in the burning chamber. The higher the temperature of the chamber, the sooner starts the pressure increase in relation to the compression phase. An ignition can take place, however, only if burning gas enters the burning chamber 1 through the nozzle 2, that means, if the pressure in chamber 3 is greater than the pressure in the burning chamber 1. It has been found that by a variation of the diameter of the nozzle, a displacement of the ignition time may be achieved, provided the same thermal conditions are prevailing. If the diameter of the nozzle 2 is increased, a tendency for an earlier ignition is observed and if the diameter is decreased, a tendency for a later ignition is observed. It should be emphasized that the diameter of the nozzle 2 is of essence also during the heating of the chamber in the showing of the embodiment of FIG. 1. At a median diameter of the nozzle of about one half of the diameter of the chamber, optimal heating effects may be obtained.

It is also of interest that the ignition takes place at a gas front in the apparatus designed in accordance with the present invention. This ignition process runs with greatest speed without the least retardation. It has been found that generally a longitudinal shape has a great ignition tendency.

The ignition process in the chamber 3 will now be described:

Upon start of the operation in the burning chamber 1, the chamber 3 is still cold and not capable of igniting. During compression, a fresh fuel mixture enters through the nozzle 2. If now the gas mixture in the burning chamber 1 is ignited from any foreign point, the process described above takes place, that means, the chamber 3 is now ready for ignition for the burning chamber 1.

It has also been found of advantage to bring about a particularly favorable and fast first ignition by an improved self-heating of the chamber 3. A measure, which favors the self-heating, consists in an arrangement, as shown in FIGS. 2 and 3, according to which the wall 4 of the chamber 3, and particularly at the foot of the chamber at 5, is formed of a thin wall starting from the nozzle body to about the center of the chamber. It is a well known experience that the hottest zone is about at the center of the chamber at the start of igniting. This hot zone moves, when the process in the burning chamber 1 comes close to full load operation and it moves in particular towards the left, namely towards the nozzle 2. During the ignition operation, the heat flow is throttled due to the wall portion 5 of the chamber 3. The main heat which develops in the chamber 3 remains in the wall portion 4 and thus in the chamber itself, whereby the chamber shows a better self-heating. In the embodiment shown in FIG. 2, the chamber 3 and the nozzle body 8 are shown separate from each other, while in the embodiment shown in FIG. 3, the nozzle body 8 and the chamber 3 are formed integrally. In this case, the chamber 3 is closed up at its rear end by a covering plate 3a.

It is sometimes also of advantage to provide means so that the chamber 3 is not too much heated up during full load operation, in order to reduce the thermal load. The reduction of the thermal load of the chamber 3 may be achieved in such a manner that the process in the chamber 3 is slowed down. This is brought about by moving the ignition front as close as possible to the chamber exit.

In the embodiment shown in FIG. 4, a neck portion 7 is provided directly on the nozzle body 8 in the chamber wall 4. The burning zone moves after the ignition immediately towards the left at the point of the neck portion, which provides a steep temperature reduction. The resulting low filling of the chamber 3 leads to a low thermal load.

Referring now to the embodiment shown in FIG. 5, the chamber 3 has at its rear end a plurality of individual bores 6. In this manner, a strong whirling and mixing of fresh and burning gas is counter-acted. In this structure, a reduction of the minimum temperature for the starting and ignition capacity of the chamber is obtained. The effect achieved thereby is generally known as catalysis of the configuration.

Referring now to FIG. 6 of the drawings, the chamber 3 forms with its wall 4 part of the current conducting feeding system. The current is fed over a conductor 10. The other pole may be grounded in known manner. By variation of the current feeding, the temperature in the chamber may be varied. In the chamber 3 such temperature may be created by the feeding of current, that the chamber 3 may be used immediately as an ignition chamber. No foreign ignition of the combustion chamber 1 is necessary. After the combustion process is in operation, if desired, the current may be shut off, since the chamber is already self-heating as stated above. It is, however, also possible by continuous current feeding to bring about a change in the ignition characteristic, that means a displacement of the ignition time point relative to the upper dead point of the piston.

Referring now to FIGS. 7 and 8, ignition chambers to which electric current is fed, are shown. The electrical conduits 10 may be arranged as a yielding lap, in order not to tear in case of thermal expansion. It is, however, also possible to provide a crosswise disposed groove on a chamber 3, as shown in FIG. 7, in order to assure an elastic equilibrium upon thermal strains. The embodiment disclosed in FIG. 8 has a chamber 3, the wall of which has bellows-like projections 11. It is thus possible to increase the resistance at predetermined points, whereby the feeding of the electric current is reduced and the applied tension is increased. Furthermore, the chamber 3 also permits to determine exactly the point of a temperature jump, whereby certain determined operational methods are achieved, which may be adjusted in this manner.

As stated above, the chamber 3 may be inserted from the inside into the wall 9 of the combustion chamber 1, for instance into a corresponding bore 12 (FIG. 9). The combustion chamber designed in accordance with the present invention provides the advantage that it may be disposed at locations where the previously known ignition means could not be provided due to the condition that necessitated access from the outside. The ignition chamber 3 practically needs no service or attention. It may be, however, of advantage to insert the ignition chamber 3 from the outside into the wall 9 of the combustion chamber 1, for instance by screwing the chamber 3 into the wall of the combustion chamber 1. The chamber 3 is in this instance covered from the outside by protecting caps 13 (FIG. 10). In all these structures, attention must be paid to the fact that the nozzle body 8 receives a good heat contact or heat engagement with the wall 9.

In order not to charge the chamber thermally to a high degree, it is preferred, as shown in FIG. 11, to provide a heat escape from the chamber 3. This leading away of heat has the purpose to avoid a great thermal load on the chamber 3 during a full load. In order to bring about this end, a concentrically disposed cooling rib, either formed from the material of the wall 9 or of the material of the protecting cap 13, engages the chamber 3 and surrounds the same for instance at the point of greatest heat development or along a corresponding wall zone. An annular slot 14 remains between the chamber 3 and the rib, which slot is much smaller and provides a much improved heat escape, the more the chamber increases its diameter due to the heat expansion.

Referring now to FIGS. 12 and 13, current fed chambers 3 are shown. In FIG. 12 the chamber 3 is edged onto the nozzle body 8 and is pressed against the latter by means of a flange ring 15. The contact pin 10 of the chamber 3 is inserted into a further contact 16. The embodiment shown in FIG. 12 has one pole, while the embodiment shown in FIG. 13 has two poles, since here the current return takes place over the conduit element 17. It is to be understood that corresponding insulating means are provided in both structures shown in FIGS. 12 and 13, which insulating means are known to men skilled in the art.

In accordance with a further development of the present invention, the ignition readiness of the chamber 3 may be improved at small motor loads by reducing the minimum temperature for the ignition in the chamber 3 and by making arrangements according to which said minimum temperature is achieved already with small motor loads, whereby the chamber 3 is protected at heavy motor loads by reducing the dependency of the chamber temperature from the motor load, and particularly the zone of greatest development of energy within the chamber is moved away from those ports of the chamber which are subjected to danger with increasing chamber temperature.

Referring now to FIG. 14, a double-walled housing 13 is closed up by the nozzle body 8 containing the nozzle 2, which double-walled housing 13 is equipped with a hexagon 18 and a thread 19, the nozzle body 8 being pressed into the double-walled housing 13 from the threaded side. The chamber which communicates with the nozzle 2 defines a locking space 20 in which the ignition front moves closer to the nozzle 2 with an increased temperature level. The wall 21 of the locking space is held thin, so that by means of most economical use of material, a non-favorable heat conduct is assured. The rear end of the locking space 20 terminates in the ignition chamber 22, the energy consummation of which provides means for maintaining the bores 23 at a predetermined heat at low motor load. The bores 23 are disposed as a cover around the ignition chamber 22, so that a favorable heat feeding takes place. The bores 23 terminate into a collecting chamber 24 which in turn is in communication with the ignition chamber 22 by means of a diaphragm or intermediate nozzle, which may be formed with an annular slot 25. If the device is at the low ignition limit, the cold fresh gas front which enters through the diaphragm 24 quickly into the warmer collecting chamber 24, may react without any difficulty with the fluid gases present in the bores 23. The collecting chamber 24 provides for a mutual activation of the processes. The formed flame backfires, ignites the chamber 22 and 20 and a general ignition in the combustion chamber takes place. If a slow process takes place in the ignition chamber 22, the ignition front is disposed in the neighborhood of the annular slot 25. The feeding of fresh gases provides at first a low temperature in the locking space 20 throughout its entire length. In case of a more active operation in the ignition chamber 22, the ignition front moves into the locking space 20 and provides that the parts of the ignition chamber 22 which are disposed behind the locking space 20, are no longer highly charged. If the total volume of the ignition chamber 22 is set equal 100%, the locking space may assume 10 to 20%, the ignition chamber 22 approximately 30% and the bores 23 50%. The annular slot 25 is of about the same order as the nozzle 2. The described device has extremely favorable characteristics, particularly during idling.

Referring now to FIG. 15 of the drawings, a chamber system is used as a heating chamber for the chamber 27. The heating chamber system assumes, if necessary, the ignition function during idling, while the chamber or the chambers 27 work during load. This division of the function is achieved by a corresponding dimensioning of the individual chamber parts, particularly of the nozzle 2 and the nozzle 28. Some or all of the bores 23 are partly of greater length, as for instance the bore 26, and for this purpose, the outer cover has been extended towards the nozzle body 8 at some places or all around, so that the nozzle body 8 also surrounds collar-like a part of the locking space 20. Some of the bores 23 are completely or partly closed and are thus not as deep as other bores. These bores are open up to the blind closing place from the side of the nozzle body 8, in order to receive small chambers 27, which are to be heated. An appreciable advantage of this arrangement resides in the fact that the heating function and the ignition function are separated from each other. It is possible to obtain optimum values for both functions.

Referring now to FIG. 16, the device disclosed in FIG. 15 is changed in such a manner that one wall 1 of the chambers is fed with electric current. The chamber system 29, which is fed with electric current, may cause the first ignitions. The system 29 receives in a manner known per se electric current through the conduits 30. The feeding of electric current may be interrupted after ignition. The chambers 22 and 27 continue to operate after the first ignitions, as described above.

The described chambers may be combined individually or in any selected manner. Practical applications of such chambers are, among others, Otto-vehicle and airplane motors, turbo-props, slot controlled free-piston-Otto-engines, diesel/high pressure Otto-engines and the like. It is possible to ignite at several places simultaneously in large Otto-combustion chambers by means of the present invention.

While I have disclosed several embodiments of the present invention, it is to be understood that these embodiments are given by example only and not in a limiting sense, the scope of the present invention being determined by the objects and the claims.

I claim:
1. In an apparatus for igniting fuel mixtures comprising at least one combustion cylinder defining a combustion chamber and an additional cylinder communicating with said combustion cylinder and defining an ignition chamber, means for compressing said fuel mixtures periodically in said combustion chamber, a nozzle member between said combustion chamber and said ignition cham- ber for communication therebetween, the inner diameter of said ignition chamber being larger than that of said nozzle and the length of said ignition chamber being greater than said inner diameter thereof, and a current feeding conduit system, the invention residing in the fact that said additional cylinder is part of said current feeding conduit system, including an electric current source and electrical conduits connecting said source with said additional cylinder.

2. The apparatus, as set forth in claim 1, wherein said additional cylinder has a conductor projecting from the rear end thereof, and said additional cylinder and said conductor, respectively, being capable of heat expansion in the longitudinal direction.

3. The apparatus, as set forth in claim 2, wherein said additional cylinder has a plurality of outside folds, in order to permit said longitudinal heat expansion.

4. The apparatus, as set forth in claim 2, wherein said additional cylinder has a plurality of outside waves to permit said longitudinal heat expansion.

5. The apparatus, as set forth in claim 2, wherein said additional cylinder has a plurality of windings to permit said longitudinal heat expansion.

6. The apparatus, as set forth in claim 2, wherein said additional cylinder has at least one bellows-like projection to permit said longitudinal heat expansion.

7. The apparatus, as set forth in claim 2, which includes an additional contact member receiving said conductor, and said conductor providing a one-pole current feed.

8. The apparatus, as set forth in claim 2, which includes a return conduit and an insulating ring member disposed between said conductor and said return conduit, in order to provide separate conduits for said current feeding conduit system.

References Cited in the file of this patent

UNITED STATES PATENTS

| | | |
|---|---|---|
| 1,832,758 | Baur | Nov. 17, 1931 |
| 2,067,274 | L'Orange | Jan. 12, 1937 |
| 2,408,394 | Guerasimoff | Oct. 1, 1946 |
| 2,673,554 | Thabeld | Mar. 30, 1954 |

FOREIGN PATENTS

| | | |
|---|---|---|
| 358,749 | France | Dec. 29, 1905 |